US 11,108,207 B2

(12) United States Patent
Honninger et al.

(10) Patent No.: US 11,108,207 B2
(45) Date of Patent: Aug. 31, 2021

(54) PULSE LASER SYSTEM THAT IS TEMPORALLY VARIABLE IN TERMS OF RHYTHM AND/OR AMPLITUDE

(71) Applicant: AMPLITUDE SYSTEMES, Pessac (FR)

(72) Inventors: Clemens Honninger, Cestas (FR); Franck Morin, Canéjan (FR); Martin Delaigue, Bordeaux (FR)

(73) Assignee: AMPLITUDE SYSTEMES, Pessac (FR)

( * ) Notice: Subject to any disclaimer, the term of this patent is extended or adjusted under 35 U.S.C. 154(b) by 507 days.

(21) Appl. No.: 15/767,899

(22) PCT Filed: Oct. 19, 2016

(86) PCT No.: PCT/FR2016/052699
§ 371 (c)(1),
(2) Date: Apr. 12, 2018

(87) PCT Pub. No.: WO2017/068282
PCT Pub. Date: Apr. 27, 2017

(65) Prior Publication Data
US 2018/0309258 A1 Oct. 25, 2018

(30) Foreign Application Priority Data
Oct. 19, 2015 (FR) ...................... 1559952

(51) Int. Cl.
*H01S 3/00* (2006.01)
*H01S 3/08* (2006.01)
(Continued)

(52) U.S. Cl.
CPC ........ *H01S 3/0085* (2013.01); *H01S 3/08054* (2013.01); *H01S 3/101* (2013.01);
(Continued)

(58) Field of Classification Search
None
See application file for complete search history.

(56) References Cited

U.S. PATENT DOCUMENTS

| 5,657,153 A | 8/1997 | Endriz et al. |
| 2005/0225846 A1* | 10/2005 | Nati ...................... H01S 3/1112 359/341.1 |

(Continued)

OTHER PUBLICATIONS

International Search Report, dated Feb. 15, 2017, from corresponding PCT application No. PCT/FR2016/052699.

*Primary Examiner* — Eric L Bolda
(74) *Attorney, Agent, or Firm* — Nixon & Vanderhye

(57) ABSTRACT

Disclosed is a laser system including a source, for generating a source signal, and an optical amplifier system. The laser system includes a pulse selection or variation device configured to select or vary the source signal so as to form a main signal composed of one or more light pulses. The main signal is temporally variable in terms of rhythm and/or amplitude. The laser system is configured to inject the main signal and a secondary signal into the optical amplifier system. The secondary signal is varied on the basis of the temporal variation in terms of rhythm and/or amplitude of the main signal so as to stabilize the power stored in the optical amplifier system in a time-dependent manner, and the laser system is configured to spatially separate the amplified main signal from the amplified secondary signal.

13 Claims, 2 Drawing Sheets

Figure 1:
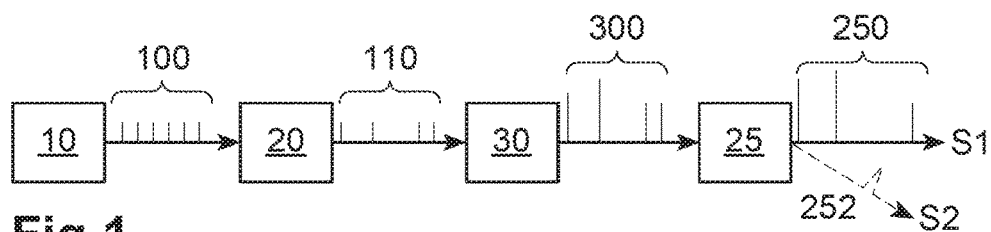

(51) Int. Cl.
*H01S 3/10* (2006.01)
*H01S 3/101* (2006.01)
*H01S 3/13* (2006.01)
*H01S 3/23* (2006.01)

(52) U.S. Cl.
CPC ...... *H01S 3/10015* (2013.01); *H01S 3/10046* (2013.01); *H01S 3/10061* (2013.01); *H01S 3/1302* (2013.01); *H01S 3/235* (2013.01); *H01S 3/2308* (2013.01); *H01S 3/2391* (2013.01)

(56) References Cited

U.S. PATENT DOCUMENTS

| | | | |
|---|---|---|---|
| 2009/0185588 A1* | 7/2009 | Munroe | H01S 3/2308 372/22 |
| 2010/0272137 A1 | 10/2010 | Kopf et al. | |
| 2011/0038031 A1* | 2/2011 | Starodoumov | H01S 3/2308 359/326 |
| 2011/0267671 A1* | 11/2011 | Peng | H01S 3/115 359/257 |
| 2013/0183046 A1* | 7/2013 | Blanchette | H01S 3/06758 398/186 |
| 2014/0050235 A1* | 2/2014 | Clowes | G02F 1/353 372/6 |
| 2015/0070753 A1* | 3/2015 | Knappe | H01S 3/2308 359/340 |
| 2015/0288134 A1 | 10/2015 | Danielius | |

* cited by examiner

PULSE LASER SYSTEM THAT IS TEMPORALLY VARIABLE IN TERMS OF RHYTHM AND/OR AMPLITUDE

TECHNICAL FIELD TO WHICH THE INVENTION RELATES

The present invention generally relates to the field of pulse lasers.

It more particularly relates to a high-power and/or high-energy pulse laser system, whose pulses are modulated in time. The invention also relates to a method for fast modulation of the rate and/or amplitude of amplified pulses from a laser system, these pulses being of high power and/or high energy. It also relates to a method for generating temporally modulated laser pulses, in a wide frequency range that can extend from a very high repetition frequency of the order of hundreds of MHz or of the GHz down to a very low rate, or even for generating a pulse on demand.

TECHNOLOGICAL BACKGROUND

The rate or repetition frequency of the pulses emitted by a pulse laser is often determined as a function of the architecture used and of the specifications desired for the laser beam.

An architecture of the Master Oscillator Power Amplifier (MOPA) type is commonly used to make high-power laser sources. In this case, a source 10, called "master oscillator", generates a source signal 100 composed of source pulses. This source signal 100 is amplified in an optical amplifier system 30 including one or more amplification stages in series. There exist different types of sources 10. The source 10 may be periodic, in particular a source based on a mode-locking laser, whose oscillator cavity length defines a repetition frequency. A periodic source 10 may also be based on a Q-switched oscillator. The mode-locking or Q-switch sources make it possible to generate pulses of picosecond duration, but do not make it possible to generate pulses on demand. Moreover, there also exist so-called nanosecond or continuous MOPAs, in which the oscillator consists of a pulsed diode and where the oscillator rate is not fixed. These pulsed-laser-diode MOPAs make it possible to generate a pulse on demand, but are limited by the pulse duration, of the order of the nanosecond.

In certain applications, the user may need to vary the repetition frequency and/or to modulate the amplitude of ultra-short laser pulses, or also to partially or fully interrupt then resume the emission of high-power and/or high-energy laser pulses.

The control of the emission of laser pulses may be performed in various ways by inserting a pulse modulation or selection device in the optical path, either upstream or downstream from the optical amplifier.

A first method consists in using a frequency-reducer device to generate pulses at a laser output frequency lower than the oscillator repetition frequency. The frequency reducer generally selects one pulse out of 2, out of 3 or out of N, and hence generates pulses at a repetition frequency that is equal to respectively, the half of, the third of or divider by N of the oscillator repetition frequency. Another method consists in using a device for selecting a pulse on demand, by means of an electronic control signal, to trigger the emission of a pulse on demand of the user. Still another method consists in using a fast shutter at the output of the laser to switch-off or switch-on the laser beam, from one pulse to the following one in time.

In FIG. 1 is shown a temporally modulated pulse laser system of the prior art. This laser system includes a source 10, an optical amplifier system 30, a pulse selector 20 arranged between the source 10 and an input of the optical amplifier system 30 and/or another pulse selector 25 arranged at the output of the optical amplifier system 30. The source 10 is for example consisted of a mode-locking oscillator, which generates a source signal 100 composed of light pulses emitted at a fixed rate, generally comprised between about 10 kHz and about 10 MHz, or even a few GHz. The duration of the light pulses of the source signal 100 is generally of the order of one femtosecond or one picosecond. In an example, the optical amplifier system 30 is based on an architecture of the MOPA type. Optionally, the amplifier system may be integrated in an architecture of the Chirped Pulse Amplifier (CPA) type comprising a stretcher upstream from an amplifier system and a downstream compressor.

The pulse selector 20 (or pulse picker) removes one or more light pulses from the source signal 100 upstream from the optical amplifier system 30 and let a modulated signal 110, composed of one or more selected light pulses, pass through. The optical amplifier system 30 amplifies the modulated signal 110 and generates an amplified signal 300, composed of one or more amplified, selected light pulses. The pulse selector 20 hence makes it possible to reduce the frequency of repetition of the pulses from the oscillator 10 before amplification or even to select on demand one or more light pulses from the source signal before amplification. There exist different types of pulse selectors 20, in particular of the acousto-optic type, based on a Bragg or electro-optic cell, for example a Pockels cell, that make it possible to deliver a pulse on demand in single-pulse regime, or periodic pulses in a frequency range generally comprised between about 10 kHz and about 100 MHz, or even a few GHz, and an RF power from a few W to about 10 W, to reach the desired diffraction efficiency.

However, modifying the repetition frequency or the time interval between pulses of the modulated signal 110 upstream from the optical amplifier system 30 generally causes a modification of the parameters of the pulses of the amplified signal 300. Although the pulses of the source signal 100 are all identical in wavelength, duration and energy, it is observed that the pulses of the amplified signal 300 are not identical. Indeed, the energy and/or the duration of the pulses of the amplified signal 300, the shape and/or the quality of the pulse beam of the amplified signal 300 may vary as a function of the rate variations between the selected pulses of the modulated signal 110.

In particular, during the generation of a series of laser pulses, the first amplified pulse has generally an energy and/or a power that are very higher than the following pulses of the series. This superpower is due to the fact that, the amplifying medium being continuously pumped, the energy stored in the amplifier increases when the time interval between pulses increases. Hence, the first pulse of a series extracts from the amplifier medium a higher energy than the following pulses. This first super-power pulse may lead to the degradation or even to the destruction of components of the optical amplifier system 30 or in the optical path downstream from the optical amplifier system 30 and impact negatively a laser method that generally requires a constant and stable energy.

The selection of pulses or the modulation of the source signal in frequency and/or in amplitude upstream from the optical amplifier system 30 hence does not make it possible, up to now, to modulate at will the frequency and/or the amplitude of the amplified pulses 300 at the output of a laser system without affecting the properties of the pulses emitted.

Another technique conventionally used to control the emission of a pulse train consists in placing an optical modulator 25 (of the acousto-optic or electro-optic type) after the laser. This modulator 25, when activated, makes it possible to selectively modify the polarization, direction of propagation, amplitude and/or phase properties of one or more pulses that pass through it so as to then be able to spatially separate certain amplified pulses 250 from the other amplified pulses 252. This technique is mainly limited for the following reasons. Firstly, the current speed of the electro-optic (EO) or acousto-optic (AO) modulators arranged downstream from the optical amplifier limits the use thereof to maximum rates of a few MHz or of about 10 MHz. Secondly, an optical modulator 25 placed at the output of a pulse laser induced power losses (from 10 to 20% for an acousto-optic modulator, of the order of 5% for an electro-optic modulator). Finally, in the case of a high-power laser, the laser beam may damage the optical modulator 25 placed at the output of the amplification system 30. The optical modulator 25 may also modify the parameters of the output laser beam: for example, spatially under the effect of a thermal lens, or also temporally, spectrally or spatially by the action of non-linear effects.

There hence exists a need for a system and a method making it possible to temporally modulate in rate and/or amplitude a high-energy and/or high-power pulse laser system, wherein the modulation can be fast up to the repetition rate of the pulses, while controlling the properties of the amplified pulses (energy, duration, spatial shape, beam quality) and ensuring the stability over time of the amplification system.

OBJECT OF THE INVENTION

In order to remedy the above-mentioned drawbacks of the state of the art, the present invention proposes a temporally modulated in rate and/or amplitude pulse laser system comprising a source adapted to generate a source signal composed of source light pulses and an optical amplifier system adapted to receive and amplify said source signal.

More particularly, it is proposed according to the invention a temporally modulated pulse laser system comprising a pulse selection or modulation device configured to select or modulate the source signal so as to form a main signal composed of one or more light pulses, the main signal being temporally modulated in rate and/or amplitude; and the laser system being configured to inject, on the one hand, the main signal and, on the other hand, a secondary signal into said optical amplifier system, the optical amplifier system forming, on the one hand, an amplified main signal that is temporally modulated in rate and/or amplitude and, on the other hand, an amplified secondary signal, the secondary signal being modulated in real time as a function of the temporal modulation in rate and/or amplitude of the main signal, so as to stabilize the energy stored in the optical amplifier system as a function of time, and the laser system being configured to spatially separate, to a first output, the temporally modulated in rate and/or amplitude amplified main signal, and to a second output, the amplified secondary signal.

The invention makes it possible to modulate in a controlled manner the train of amplified light pulses while inducing not many or no loss in the laser. The laser system is able to operate in a frequency range extending from the null frequency to the frequency of the main source, which may reach the order of the GHz, and avoids exposing a pulse selector, that is often an optical device that is fragile with respect to the amplified pulses of high energy and/or high power, after the amplification.

Other non-limitative and advantageous features of the temporally modulated pulse laser system according to the invention, taken individually or according to any technically possible combination, are the following:

- the optical amplifier system has a spectral gain band adapted to amplify the main signal at a first wavelength and the secondary signal at a second wavelength, and the laser system includes spectral filter configured to spectrally separate the amplified main signal at the first wavelength and the amplified secondary signal at the second wavelength;
- the optical amplifier system is adapted to receive and amplify the main signal polarized in a first polarization state and, respectively, the secondary signal polarized in a second polarization state, said first and second polarization states being orthogonal to each other, and the laser system includes a polarizing separation filter arranged and configured to separate, on the one hand, the amplified main signal polarized in the first polarization state and, on the other hand, the amplified secondary signal polarized in the second polarization state;
- the optical amplifier system is adapted to amplify the main signal and the secondary signal propagating along mutually opposed senses between a first input-output and a second input-output of the optical amplifier system and the laser system includes at least one optical filter arranged and configured to separate, on the one hand, the amplified main signal and, on the other hand, the amplified secondary signal;
- the optical amplifier system has a spatial and/or angular aperture adapted to amplify the main signal propagating along a first direction and the secondary signal propagating along a second direction, the second direction being spatially and/or angularly separated from the first direction, and the laser system is configured to spatially and/or angularly separate the amplified main signal propagating along the first direction and, respectively, the secondary amplified signal propagating along the second direction;
- the laser system includes a first source emitting the source signal and a second source emitting the secondary signal, the pulse selection or modulation device including a pulse selector or modulator arranged between the first source and the optical amplifier system, the pulse selector or modulator receiving the source signal and forming the main signal, the laser system further including an optical beam combiner arranged and configured to inject, on the one hand, the main signal and, on the other hand, the secondary signal into said optical amplifier system;
- the laser system includes a single, preferably periodical, source emitting the source signal, the pulse selection or modulation device including a pulse selector or modulator arranged between the source and the optical amplifier system, the pulse selector or modulator receiving the periodic source signal and forming, on the one hand, the main signal and, on the other hand, the secondary signal;
- the pulse selection or modulation device includes an optical polarization modulator, the optical modulator being configured to receive and modulate the source signal in polarization, so as to generate the main signal polarized in the first polarization state, and to generate the secondary signal polarized in the second polarization state;

the pulse selection or modulation device includes an optical direction modulator configured to receive and modulate the source signal so as to generate the main signal propagating along one direction, and to generate the secondary signal propagating along another direction;

the pulse selection or modulation device includes an optical modulator configured to receive and modulate the periodic source signal in amplitude, so as to generate the amplitude-modulated main signal, and wherein the secondary signal is modulated in amplitude as a function of the temporal modulation of amplitude of the main signal.

According to another embodiment, the optical amplifier system includes a regenerative cavity including a first part comprising a first optical amplifier and a second part, the pulse selection or modulation device comprising a Pockels cell arranged in the regenerative cavity between the first part and the second part, the Pockels cell being configured to modulate an optical phase shift in the regenerative cavity, an optical filtering device including a first polarizer arranged between the Pockels cell and the first part of the cavity, and a second polarizer arranged between the Pockels cell and the second part of the cavity, the Pockels cell being configured to modulate the optical phase shift a first time so as to trap a source light pulse into the regenerative cavity, the regenerative cavity amplifying the trapped light pulse to form an amplified light pulse, the Pockels cell being configured to modulate the optical phase shift a second time, either when the amplified light pulse circulates in the first part of the regenerative cavity to form an amplified main signal, the second polarizer being configured so as to direct the amplified main signal towards the first output of the regenerative cavity, or when the amplified light pulse circulates in the second part of the regenerative cavity to form an amplified secondary signal, the first polarizer being configured so as to direct the amplified secondary signal towards the second output of the regenerative cavity.

Advantageously, the pulse selection or modulation device is configured to select or modulate the source signal with a switching time comprised between sub-ns and a few ns.

Preferably, the first source is periodic with a repetition period comprised between 10 kHz and 1 GHz, and the source light pulses have a duration comprised between about 1 picosecond and a few hundreds of nanoseconds.

In the various embodiments, the pulse selection or modulation device is controlled electronically to select or modulate the source signal with a switching time preferably comprised between about 1 ns and 10 ns.

The invention also relates to a method of modulation in rate and/or amplitude of the pulses at the output of a regenerative cavity including a Pockels cell arranged between a first polarizer and a second polarizer in the regenerative cavity, the Pockels cell delimiting a first part and a second part of the regenerative cavity and the regenerative cavity including at least one optical amplifier arranged in the first part of the regenerative cavity, the method comprising the following steps:

applying a first impulse switching voltage to the Pockels cell so as to inject and trap a source light pulse into the regenerative cavity;

amplifying the light pulse trapped into the regenerative cavity to form an amplified light pulse, while applying a zero modulation voltage to the Pockels cell;

applying a second impulse switching voltage to the Pockels cell to modulate the optical phase shift when the amplified light pulse circulates in a first part of the regenerative cavity to form an amplified main signal, the second polarizer being configured so as to direct the amplified main signal towards a first output of the regenerative cavity, and/or when the amplified light pulse circulates in the second part of the regenerative cavity to form an amplified secondary signal, the first polarizer being configured so as to direct the amplified secondary signal towards a second output of the regenerative cavity.

According to a particular embodiment, the application of the second voltage includes a slope as a function of time so as to modulate in amplitude the amplified main signal towards the first output and/or the amplified secondary signal towards the second output.

DETAILED DESCRIPTION OF AN EXEMPLARY EMBODIMENT

The following description with respect to the appended drawings, given by way of non-limitative examples, will allow to well understand in what consists the invention and how it may be made.

Figure 2:
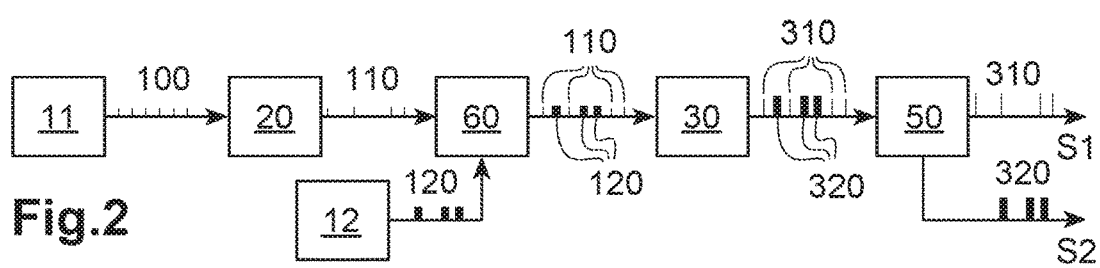
Figure 3:
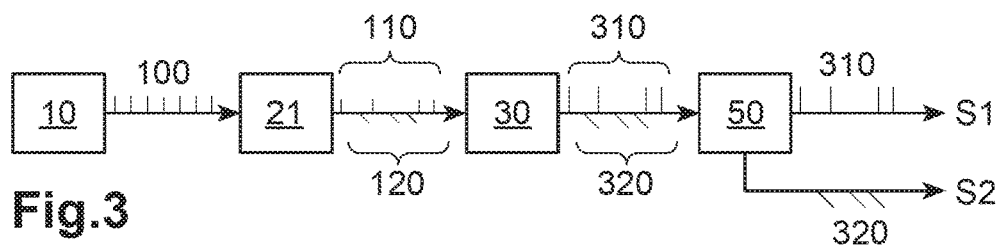
Figure 4:
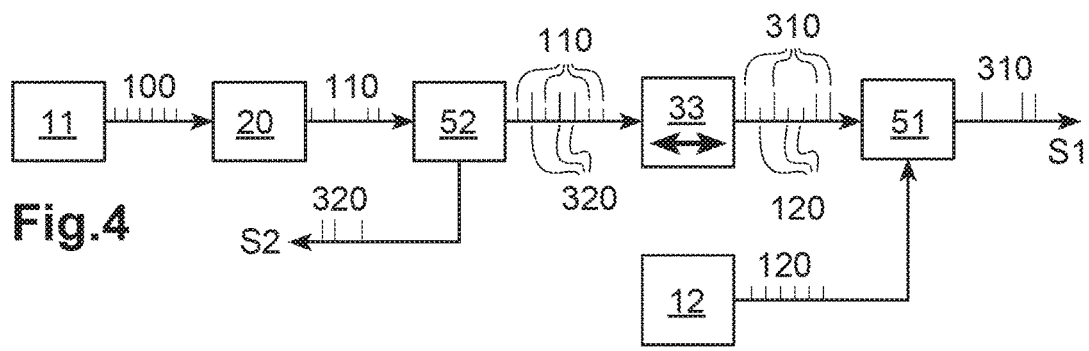
Figure 5:
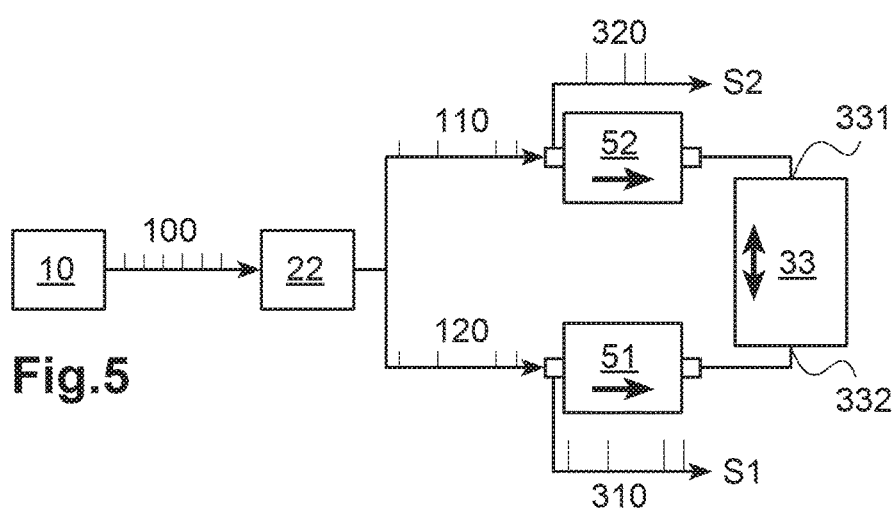
Figure 6:
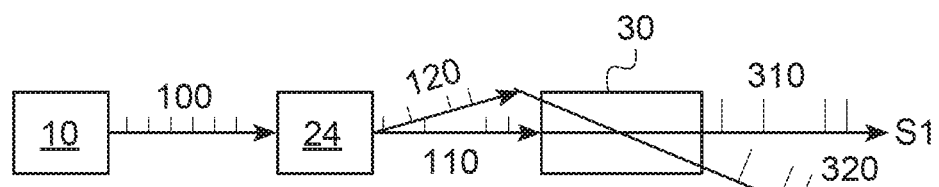
Figure 7:
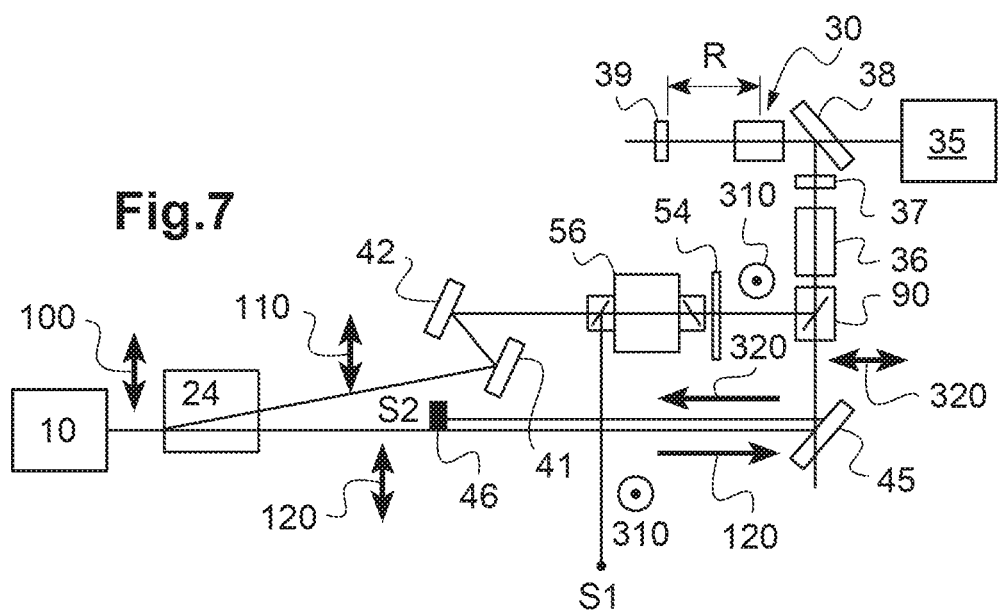
Figure 8:
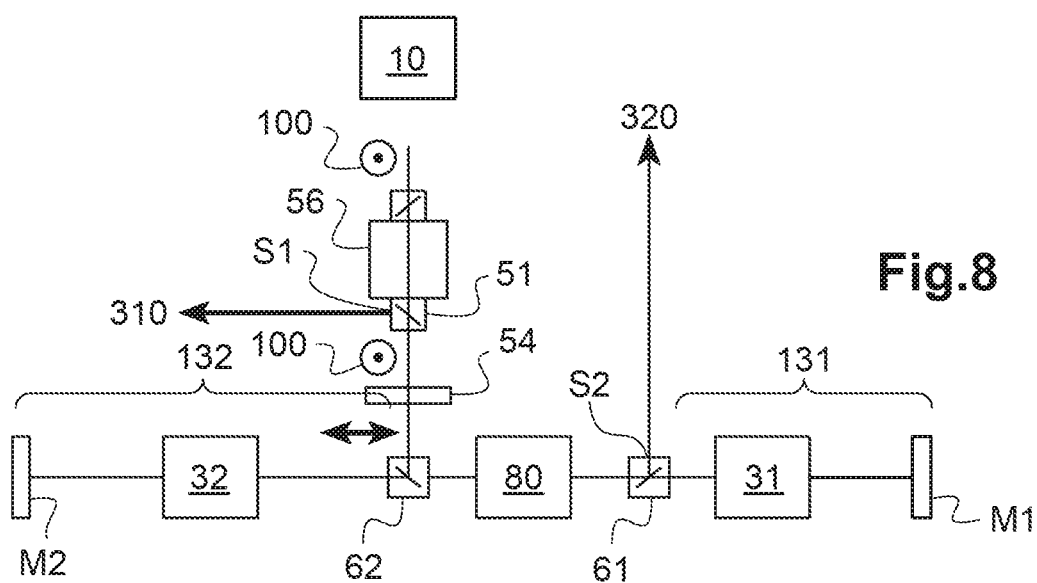

In the appended drawings:

FIG. 1 schematically shows a temporally modulated pulse laser system according to the prior art;

FIG. 2 schematically shows the general principle of a temporally modulated pulse laser system, according to a first embodiment of the invention;

FIG. 3 schematically shows a temporally modulated pulse laser system according to a variant of the first embodiment;

FIG. 4 schematically shows a temporally modulated pulse laser system according to a second embodiment of the invention;

FIG. 5 schematically shows a temporally modulated pulse laser system according to an example of the second embodiment;

FIG. 6 schematically shows a temporally modulated pulse laser system according to a third embodiment of the invention;

FIG. 7 schematically shows a temporally modulated pulse laser system according to a fourth embodiment of the invention;

FIG. 8 schematically shows a temporally modulated pulse laser system according to a fifth embodiment of the invention.

In FIG. 2 is schematically shown a first embodiment of a temporally modulated pulse laser system. This embodiment is based on the use of a pulse selector 20 arranged upstream from the optical amplifier, an optical beam combiner configured to inject both a main signal and a secondary signal of different wavelength and/or polarization into an optical amplifier system 30 adapted to amplify these two signals, and a spectral and/or polarization filtering device adapted to separate the amplified main signal from the amplified secondary signal.

More precisely, in the scheme of FIG. 2, a pulse laser system is shown, which includes a first source 11, a pulse selector 20, a secondary source 12, an optical beam combiner 60, an optical amplifier system 30 and an optical filter 50.

The first source 11 emits a source signal 100. The first source 11 is consisted for example of a periodic oscillator that emits a periodic source signal 100 at a determined repetition frequency $f_{rep}$. A periodic oscillator may be consisted of a mode-locking laser or a Q-switched oscillator. The pulses of the source signal 100 have preferably a duration between a few 10 ps and the nanosecond regime.

The optical amplifier system 30 may include a single optical amplifier or several optical amplifiers arranged in series or also several optical amplifiers arranged in parallel and multiplexed by a splitting coupler. The optical amplifiers of a same system may possibly be of different nature: a solid, crystal, thin disc (thin disc laser), slab (slab laser), optical fibre or photonic crystal fibre optical amplifier. The optical amplifier 30 is generally continuously pumped. The gain optical amplifying medium may be doped with a rare earth element, in particular doped with ytterbium, neodymium, erbium, thulium, holmium or an alloy of certain among these rare earth elements.

The pulse selector 20 is arranged in the optical path connecting the first source 11 to the optical amplifier 30. The pulse selector 20 comprises for example an acousto-optic or electro-optic modulator. The pulse selector 20 is controlled electronically to switch with a fast response time, of the same order of magnitude or slightly higher than the duration separating two successive pulses, and generally comprised between about 1 ns (or even faster in certain cases) and a few ns. The pulse selector 20 removes (by absorption, deflection by acousto-optic modulation, polarization conversion by electro-optic or acousto-optic modulation in shear-mode) one or more light pulses of the source signal and forms a main signal 110 composed of one or more selected light pulses.

The secondary source 12 is configured to emit a secondary signal 120, for example composed of one or more secondary light pulses, a secondary light pulse being generated selectively on demand, as a function of the modulation of the main signal 110. The secondary source 12 is controlled electronically to switch with a fast response time generally comprised between ~1 ns (in certain cases even ~ps) . . . and ~10 ns. Moreover, in the case where it is desired to modulate the main signal at a very low rate, for example to generate a single-shot amplified pulse on demand, the duration during which the secondary source is active may also be long, wherein this duration can be for example of several seconds.

The optical beam combiner 60 is arranged so as to receive, on the one hand, the main signal 110 and, on the other hand, the secondary signal 120. The optical beam combiner 60 is selected as a function of the respective properties of the signals of the main source 11 and of the secondary 12. The optical beam combiner 60 may be an optical combiner of the spatial type, as a cube or a partially transparent and partially reflective plate, or a combiner of the spectral type, for example a dichroic plate, or also a polarization combiner, for example a polarizing cube. The optical combiner 60 makes it possible to inject the main signal 110 and the secondary signal 120 into the optical amplifier system 30. The optical amplifier system 30 hence amplifies both the main signal 110 and the secondary signal 120, to form an amplified main signal 310 and an amplified secondary signal 320.

We consider conditions where the secondary signal 120 consumes approximately the same population inversion as the main signal 110 in the optical amplifier 30. More precisely, the secondary signal 120 is temporally modulated so that the energy stored in the optical amplifier remains at a constant level over time, whatever the temporal modulation of the main signal 110. Generally, the pulses of the main signal 110 and of the secondary signal 120 have not the same duration and/or the same energy. Nevertheless, the secondary signal 120 is dimensioned so that the combination of the main signal 110 and the secondary signal 120 has for effect to maintain the level of population inversion of the optical amplifier 30 at a constant value over time, whatever the modulation of the main signal 110. Hence, whatever the time interval separating two consecutive selected pulses of the main signal 110, the gain of the optical amplifier system 30 remains constant for each pulse of the amplified main signal 310. When a main signal 110 composed of selected pulses is sent in the optical amplifier 30, after an interruption that removes one or more source pulses, all the selected pulses of the main signal 110 are amplified with the same gain.

In practice, the energy of the pulses of the amplified main signal 310 as a function of time is measured and the power, the energy, the wavelength and/or the duration of the pulses of the injected secondary signal 120 is modified so as to stabilize the energy of the pulses of the amplified main signal 310.

In this first embodiment, the secondary source 12 must be able to be switched on and switched off fast enough as a function of the operation of the pulse selector 20. In a first example, the secondary source 12 comprises a laser diode that is able to be fast modulated at a wavelength close to the wavelength of the main source 11, the wavelengths of the main source 11 and of the secondary source 12 being located in the gain band of the optical amplifier system 30. The secondary source 12 may be a laser diode of the type used in the telecoms with a bandwidth of the order of 1 GHz. The duration of the pulses emitted by this laser diode 12 is typically of the order of the nanosecond (for example, from 1 to 20 ns). According to a variant, the secondary source 12 is consisted of a second mode-locking oscillator that is synchronized in rate with the main oscillator of the main source 11. This variant is more expensive than a telecom diode but may be an interesting alternative when no diode is available in the desired spectral range.

Particularly advantageously, the laser system includes a synchronization device connecting the pulse selector 20 to the secondary source 12, so as to trigger the emission of a pulse of the secondary signal 120 when the pulse selector removes a light pulse from source signal 100.

The optical filter 50 is arranged at the output of the optical amplifier 30. The optical filter 50 is configured so as to spatially separate the amplified main signal 310 towards a first output S1, and, respectively, the amplified secondary signal 320 towards a second output S2. This amplified secondary signal 320 may be suppressed or used for another application.

In an example of this first embodiment, the main source 11 emits a main signal 100 at a main wavelength and the secondary source 12 emits a secondary signal 120 at a secondary wavelength, different from the main wavelength. The main source 11 and the secondary 12 are selected so that the main wavelength and the secondary wavelength are located inside the gain band of the optical amplifier 30. Preferably, the gain of the optical amplifier 30 is approximately identical to the first wavelength and to the second wavelength. However, the main source 11 is generally ultra-short and has a spectral width denoted FWHMprince. A secondary source is chosen, which has pulses of a duration of the order of the nanosecond and a narrow spectral width (close to Delta). In order to separate the amplified main signal 310 from the amplified secondary signal 320 without significant losses for the amplified main signal 310, the secondary wavelength is chosen out of the spectral band centred to the main wavelength and of width equal to about 1.5*FWHMprince or 2*FWHMprince. In this example, the beam combiner 60 is for example a dichroic filter adapted to combine the main signal 110 to the main wavelength and the secondary signal 120 to the secondary wavelength. Advantageously, the optical filter 50 is a dichroic filter selected so as to allow a spectral separation, on the one hand, the amplified main signal 310 at the main wavelength and, on the other hand, the amplified secondary signal 320 at the secondary wavelength. The laser diode 12 may be modulated very fast so as to inject the secondary signal 120 via the beam combiner 60. The power, the energy, the wavelength and/or the duration of the laser diode 12 may be adjusted so that the secondary signal 120 consumes approximately the same gain as the main signal 110. This embodiment hence makes it possible to control the stability of the amplified main single 310.

This example of the first embodiment may be applied to any optical amplifier 30 having a gain medium whose spectral band of amplification is wide enough to amplify two signals of different wavelengths, which can be separated from each other by a spectral filter 50.

In a variant, the main signal 110 and the secondary signal 120 are polarized in polarization states respectively orthogonal to each other, the optical amplifier system being adapted to amplify signals according to these orthogonal polarization sates. In this variant, the optical filer 50 includes a polarizing filter, for example a polarizer configured to spatially separate the amplified main signal 310 to the output S1 and the amplified secondary signal 320 to the output S2. The beam combiner is for example a polarizer configured to combine the main signal 110 polarized in a first polarization state and the secondary signal 120 polarized in a second polarization state.

In FIG. 3 is schematically shown a variant of the first embodiment of a laser system, based on a modulation of the polarization. In this variant, the same elements are represented by the same reference signs as in FIG. 2. A signal source 10 replaces the main source 11 and the secondary source 12. The source 10 emits a source signal 100 composed of pulses, generally at a determined repetition frequency $f_{rep}$. In this variant, a polarization modulator 21 is used. The light pulses of the source signal 100 are herein polarized in a first polarization state, for example linear or circular or elliptic. The polarization modulator 21 is configured to allow the fast switching of the polarization of the source signal between a first polarization state and a second polarization state, orthogonal to the first polarization state. The switching time of the polarization modulator 21 is preferably comprised between 1 ns and a few ns. The polarization modulator 21 is for example consisted of an electric-optical modulator based on a Pockels cell or an acousto-optic modulator. By way of example, the polarization modulator 21 is a phase modulator that introduces selectively either a phase shift equal to 0 to form the main signal 110 composed of pulses polarized in the first polarization state, or a phase shift equal to $\pi$ to form the secondary signal 120 composed of pulses polarized in the second polarization state. The optical amplifier system 30 amplifies, on the one hand, the main signal 110 to form an amplified main signal 310 polarized in the first polarization state, and, respectively, the optical amplifier system 30 amplifies the secondary signal 120 to form an amplified secondary signal 320 polarized in the second polarization state. At the output of the optical amplifier system 30, an optical filter of the polarizer type 52 is arranged and oriented so as to make it possible to spatially separate, to the output S1, the amplified main signal 310 composed of amplified pluses polarized in the first polarization state, and, respectively, to the output S2, the amplified secondary signal 320 composed of amplified pulses polarized in the second polarization state.

In an exemplary embodiment, the source 10 is a fibred source and the optical amplifier 30 includes an amplifying optical fibre. The amplifying optical fibre may be a polarization-holding fibre or a standard fibre arranged in a controlled environment so as to maintain the first polarization state and the second polarization state. The selection of the pulses of the main signal 110 is performed electronically by a control system of the polarization modulator 21. By construction, the light pulses of the main signal 110 and of the secondary signal 120 have the same wavelength, the same power. The optical amplifier 30 has hence a constant level of population inversion whatever the polarization modulation of the main signal.

The amplified main signal 310 and the amplified secondary signal 320 may be used independently relative to each other. In an application, the polarization modulator 21 selects every other pulse, which makes it possible to have at the output of the amplifier system two laser beams composed of amplified periodic pulses, each output being at a repetition frequency equal to half the repetition frequency of the source 10. Two periodic laser pulses outputs are hence obtained for a lesser cost than that of two complete laser systems.

We hence have an optical gate making it possible to release or not the laser pulses without changing the parametric values (energy, duration, spatial shape . . . ) of the amplified pulses 310, and which is fast enough to be open or closed from one pulse to the following one. The state change speed of this optical gate defines the maximum rate at which the device is able to operate.

These examples of the first embodiment describe the selection of a main signal composed of the totality of one or more main pulses from a periodic source signal.

More generally, the main signal may be composed of a part of the source signal modulated in amplitude as a function of time. Hence, instead of selecting or not a full pulse, at least one main pulse composed of a part of a source pulse is selected. For example, 80% of the energy of a source pulse is selected. The amplitude of the selected pulse may vary from one pulse to the following one according to the needs. Similarly to the principle of the present disclosure, a secondary signal is injected, which is adapted to compensate for the amplitude variations of the pulses of the main signal so as to stabilise the gain of the optical amplifier system, whatever the modulation amplitude of the main signal. The simultaneous injection into the optical amplifier of the main signal modulated in amplitude and of the secondary signal produces a competition between the amplifications of these two signals. The respective amplification gains of the main signal and of the secondary signal may be different from each other. For example, the amplitude, the energy and/or the duration of the secondary signal injected is modified, so as to maintain a population inversion of the excited ions in the optical amplifier system essentially constant over time. Preferably, the intensity of the secondary signal is adjusted as a function of the intensity of the main signal so that the saturated gain of the optical amplifier remains constant. An analog amplitude modulation of the amplified main signal is hence generated while ensuring a constant gain in the optical amplifier system. The amplified main signal and the amplified secondary signal are then spatially separated from each other according to any one of the described examples.

In an embodiment of this amplitude modulation, a polarization modulator 21 makes it possible not only to switch the polarization state of the source but also to modulate the amplitude of the selected pulses of the main signal 110. This amplitude modulation is obtained when a fraction of the first polarization state may be transformed into the second polarization state. For example, a polarization modulator 21 of the electro-optic type may be controlled to introduce a phase shift comprised between 0 and a half-wavelength. Similarly, a polarization modulator of the acousto-optic type may be controlled to produce a different diffraction efficiency between the order 0 and the order 1. Hence, generally, the main signal 110 injected into the optical amplifier system is composed of a part of the source signal 100, and the secondary signal 120 injected into the optical amplifier system is temporally modulated as a function of the temporal variations of the main signal 110, so that the level of population inversion of the optical amplifier remains constant whatever the temporal variations of the main signal.

In FIG. 4 is schematically shown a temporally modulated in rate and/or amplitude pulse laser system according to a second embodiment of the invention.

This second embodiment is based on the use of a bidirectional optical amplifier system 33, i.e. adapted to amplify two beams propagating in mutually opposed senses inside the optical amplifier system 33. In this second embodiment, the injection of the secondary signal 120 into the optical amplifier system 30 is made in the sense opposite to that of the main signal 110.

The laser system of FIG. 4 includes a main source 11 and a secondary source 12. A pulse selector or modulator 20, of the acousto-optic or electro-optic type, is arranged between the main source 11 and a first input-output of a bidirectional optical amplifier system 33. The pulse selector or modulator 20 removes a pulse part, or one or more light pulses from the preferably periodic source signal 100, in the optical path connecting the source 10 to the optical amplifier 33 and lets through a main signal 110 composed of a part of the source signal, for example a part of one or more selected light pulses, towards the optical amplifier system 33. The main signal 110 propagates in the bidirectional optical amplifier 33 along a first sense of propagation. The switching time of the pulse selector or modulator 20 is preferably comprised between ~1 ns (or even sub-ns) and ~10 ns. The main signal 110 is amplified so as to form an amplified main signal 310 propagating along the first sense of propagation.

The secondary source 12 emits a secondary signal 120, modulated as a function of the modulation in amplitude and/or rate of the main signal 110. An optical filter 51 is arranged between the secondary source 12 and a second input-output of the optical amplifier system 33. The optical filter 51 may be chosen among a spatial (beam combiner), directional (optical circulator or isolator), spectral or polarizing filter, according to the features of the main signal or of the secondary signal. The optical filter 51 injects the secondary signal 120 into the bidirectional optical amplifier system 33 through a second input-output, so that the secondary signal 120 propagates in the sense opposite to that of the main signal in the bidirectional optical amplifier system 33. Hence, the secondary signal 120 is amplified so as to form an amplified secondary signal 320 propagating along the sense opposite to the first sense of propagation. Moreover, the optical filter 51 makes it possible to separate the amplified main signal 310 from the secondary signal 120 to direct the amplified main signal 310 towards the first output S1.

Another optical filter 52 is arranged between the pulse selector or modulator 20 and the first input-output of the optical amplifier system 33. This optical filter 52 separates spatially the amplified secondary signal 320 from the main signal 110 and directs the amplified secondary signal 320 towards the second output S2. Preferably, the optical filter 52 is a passive filter, for example a dichroic mirror if sources 11, 12 of different wavelengths are used, or a polarizer if signals 110, 120 polarized in two different polarization states are used, or also an optical circulator or isolator.

This second embodiment is particularly adapted to the optical fibre amplifiers, which are generally bidirectional but generally do not allow a spatial and/or angular separation of the beams.

In FIG. 5 is schematically shown a temporally modulated pulse laser system according to an example of the second embodiment of the invention. The laser system includes a main source 10, which emits a periodic source signal 100 composed of light pulses at a determined repetition frequency $f_{rep}$. The light pulses of the source signal 100 are herein polarized in a first polarization state, for example linear or circular or elliptic. An optical modulator 22 forms, from the source signal 100, on the one hand, the main signal 110 directed towards a first input-output of the optical amplifier 33 and, on the other hand, the secondary signal 120 directed towards the second input-output of the optical amplifier 33. Herein, an optical isolator 51 makes it possible to separate the amplified main signal 310 to the output S1. Another optical isolator 52 makes it possible to separate the amplified secondary signal 320 to the output S2.

In FIG. 6 is schematically shown a temporally modulated pulse laser system according to a third embodiment of the invention.

The third embodiment is based on the use of an optical amplifier system 30 having a sufficient spatial extent and/or angular aperture to amplify two laser pulse beams spatially and/or angularly separated from each other.

The system of FIG. 6 includes a source 10 that emits a periodic source signal 100 composed of periodic light pulses at a repetition frequency $f_{rep}$. An optical modulator 24 is arranged between the source 10 and the optical amplifier system 30, in the optical path of the source pulses 100. The optical modulator 24 is adapted and configured to spatially and/or angularly separate the periodic source signal 100, on the one hand, into a main signal 110 propagating along a direction of propagation, for example identical to the direction of propagation of the periodic source signal 100, and on the other hand, a secondary signal 120, which is for example angularly deflected with respect to the direction of propagation of the main signal 110. The optical modulator 24 is for example an acousto-optic modulator configured to make it possible to deflect the secondary signal 120. The switching time of the optical modulator 24 is comprised between ~1 ns and 10 ns. The main signal 110 is directed towards the optical amplifier 30 along a first direction of propagation and amplified to form an amplified main signal 310. The optical amplifier 30 has a wide enough spatial extent and/or angular aperture to accept the secondary signal 120 propagating in a second direction. If necessary, a mirror-based optical system is arranged in the optical path of the main signal and/or the secondary signal, to increase the spatial and/or angular separation between the main signal and the secondary signal of the optical signal 30. The secondary signal 120 propagates inside the optical amplifier 30 along a second direction of propagation, spatially and/or angularly separated from the first direction of propagation. The optical amplifier 30 amplifies the main signal 110, respectively the secondary signal 120, to form an amplified main signal 310 propagating along the first direction and, respectively, an amplified secondary signal 320 propagating along a second angular direction. Advantageously, the first and the second propagation directions are sufficiently spatially and/or angularly separated from each other to make it possible to use selectively the amplified main signal 310 on the output S1, and possibly the amplified secondary signal 320 on the output S2. In this third embodiment, the filtering after amplification is a filtering of the spatial and/or angular type. If necessary, a spatial filter device, for example based on one or more mirrors, is placed at the output of the optical amplifier system and configured to increase the spatial and/or angular separation between the two amplified signals 310, 320.

This third embodiment applies in particular to an optical amplifier based on a Yb, Nd, Er, Tm, Ho, Ti and/or Cr-doped crystal, for example a Yb:YAG, neodymium-YAG (Nd: YAG) or titanium-sapphire crystal, or also an Er:YAG, Tm:YAG, Ho:YAG crystal.

In FIG. 7 is schematically shown an exemplary embodiment of a temporally modulated pulse laser system according to a fourth embodiment of the invention.

The laser system of FIG. 7 includes a source 10 that emits a periodic source signal 100 composed of linearly polarized light pulses, for example in a p-polarization state, parallel to the plane of FIG. 7. The laser system includes an acousto-optic modulator 24. In a first state of the acousto-optic modulator 24, when an adapted modulation voltage is applied to the acousto-optic modulator 24, the source signal is deflected by diffraction in the order 1 and forms a main signal 110 propagating along a first direction of propagation. On the contrary, when a zero modulation voltage is applied to the acousto-optic modulator 24, the source signal is not deflected and forms a secondary signal 120 propagating along a second direction of propagation, angularly separated from the first direction of propagation. At the output of the acousto-optic modulator 24, the main signal 110 and the secondary signal 120 have the same polarization state, herein the p-polarization state. A mirror-based optical system 41, 42 makes it possible to direct the main signal 110 towards an optical isolator 56. A half-wave plate 54 ($\lambda/2$) makes it possible to change the polarization state of the main signal 110 into the orthogonal linear polarization state, herein the s-polarization state. Another mirror-based optical system 45 makes it possible to direct the secondary signal 120 towards a polarizer 90. The polarizer 90 makes it possible to combine the s-polarized main signal 110 propagating along a first optical path with the p-polarized secondary signal 120 propagating along a second optical path. At the output of the polarizer 90, the s-polarized main signal 110 propagates along a direction of propagation different from the p-polarized secondary signal 120, although the angular deflection between these two signals is reduced compared with the angular deflection at the output of the acousto-optic modulator 24. An optical system consisted for example of an afocal telescope 36, followed by a focusing lens 37 and a dichroic mirror 38, makes it possible to direct the s-polarized main signal 110 and the p-polarized secondary signal 120 towards the optical amplifier crystal 30. A pump source 35 ensures the continuous optical pumping of the optical amplifier crystal 30 thanks to the coupling by the dichroic mirror 38. A focusing mirror 39, having a curvature radius R centred on the optical amplifier crystal 30, makes it possible to perform a double passage of the signals to be amplified in the optical amplifier crystal 30. Inside the optical amplifier crystal 30, the s-polarized main signal 110 is superimposed to the p-polarized secondary signal 120, to ensure the constancy of the gain of the optical amplifier 30. After a double amplification in the optical amplifier crystal 30, an amplified main signal 310 and an amplified secondary signal 320 are directed towards the polarizer 90. This polarizer 90 makes it possible to spatially separate the amplified main signal 310 and the amplified secondary signal 320 from each other. The s-polarized amplified main signal 310 at the output of the polarizer 90 passes through the half-wave plate 54 that changes the polarization state of the amplified main signal 310 into the orthogonal linear polarization state, herein the p-polarization state. The optical isolator 56 makes it possible to extract the p-polarized amplified main signal 310 to the output S1. This amplified main signal 310 may then be transmitted to a compressor or for any considered application. On the other hand, the amplified secondary signal 320 is reflected on the mirror 45 towards an output S2, for example an absorption device 46 (or beam dump).

In this exemplary embodiment, the optical modulator 24 is arranged in the optical path of the source 10 and hence modulates the low-power periodic source signal 100. This configuration ensures a modulation with a high efficiency while avoiding damages to the optical modulator 24. Moreover, this modulation is fast, because the switching time of the optical modulator 24 is comprised between ~1 ns (or even sub-ns) and ~10 ns. The periodic source signal diffracted in the order 1 is diffracted with a diffraction efficiency of about 85% or more. This beam diffracted in the first order forms a main signal 110 composed of a part of the periodic source signal. The losses in the main signal 110 are hence very limited. When the acousto-optic modulator is activated, the residual beam not deflected in the order 0 is also amplified in the optical amplifier crystal 30. However, the overlap is greater with the main signal diffracted in the order 1 compared with the overlap of the residual beam not diffracted in the order 0, so that the beam not diffracted in the order 0 sees a lower gain. When the acousto-optic modulator 24 is inactive, the pulse beam is not diffracted in the order 1. The secondary signal 120 is amplified in the optical amplifier crystal 30, then the amplified secondary signal 320 is spatially separated by the polariser 90 and blocked in the absorption device 46.

In FIG. 8 is schematically shown a temporally modulated pulse laser system according to a fifth embodiment of the invention. This fifth embodiment is based on the use of a laser with a regenerative cavity including a single one optical modulator 80 arranged inside the regenerative cavity. This optical modulator 80 serves both as a pulse selector and as an optical modulator to direct the pulses either towards a first output S1 or towards a second output S2, as a function of the switching instant of the optical modulator.

In a regenerative cavity amplifier of the prior art, a first optical modulator serves as an optical switch arranged inside the optical cavity to inject one pulse at a time into the regenerative cavity, preferably with a repetition frequency constant over time. A second optical modulator is generally arranged at the output of the regenerative cavity to spatially and/or temporally modulate the amplified pulses. These two optical modulators may be of the acousto-optic type or of the Pockels cell type.

The system of FIG. 8 includes a source 10 that generates a periodic source signal 100 composed of light pulses. The source 10 is for example an oscillator having a repetition frequency $f_{osc}$. The light pulses of the source signal 100 are herein linearly polarized in the s-polarization state. An optical isolator 56 forms a first input-output of the regenerative cavity. A half-wave plate 54 ($\lambda/2$) changes the polarization state of the light pulses of the source signal 100 into the p-polarization state. A polarizer 53 transmits the p-polarized source signal 100 towards a Pockels cell 80.

The regenerative cavity includes a first amplifying part 131, a second amplifying part 132 and a Pockels cell 80 arranged between this first amplifying part 131 and this second amplifying part 132. The first amplifying part 131 of the regenerative cavity comprises a first optical amplifier 31 arranged between a first mirror M1 and a polarizer 61. Similarly, the second amplifying part 132 of the regenerative cavity comprises a second optical amplifier 32 arranged between a second mirror M2 and another polarizer 62. The Pockels cell is hence placed between the polarizer 61 and the polarizer 62.

When no pulse is trapped in the regenerative cavity and the Pockels cell 80 is in idle state (i.e. the modulation voltage applied to the Pockels cell is zero), a p-polarized source pulse 100, which is reflected by the polarizer 62 and passes through the Pockels cell 80, remains p-polarized. The polarizer 61 is oriented so as to transmit only the s-polarization in the first amplifying part 131 of the regenerative cavity and to transmit the p-polarization towards an output S2. Hence, as long as the modulator remains inactive, no p-polarized source pulse enters in the first amplifying part 131 of the regenerative cavity.

The pulse trapping and the pulse regenerative amplification are performed as follows. When the Pockels cell 80 is activated, the modulation voltage applied to the Pockels cell is such that the Pockels cell produces a half-wave phase shift. The activated Pockels cell receives a p-polarized source pulse 100 and changes the polarization of this pulse constituting the source signal 100 into the s-polarization. The polarizer 52 transmits this s-polarized source pulse 100 towards the first amplifying part 131 of the regenerative cavity. The s-polarized source pulse is amplified a first time by passing through the first optical amplifier 31 towards the mirror M1, is then reflected on the mirror M1, and is amplified a second time by passing through the first optical amplifier 31 towards the polarizer 52. The modulation voltage of the Pockels cell 80 is switched from a half-wave phase shift to a zero phase shift while this s-polarized source pulse 100 is circulating in the first part 131 of the regenerative cavity and before it passes back through the Pockels cell a second time. Hence, the Pockels cell does not modify the s-polarization of an amplified pulse exiting from the first amplifying part 131 of the regenerative cavity. The polarizer 53 transmits this s-polarized amplified pulse towards the second amplifying part 132 of the regenerative cavity. The s-polarized pulse is amplified again by passing through the second optical amplifier 32 towards the mirror M2, is then reflected on the mirror M2, and is amplified a second time by passing through the second optical amplifier 32 towards the polarizer 53, while remaining s-polarized. Hence, an s-polarized pulse is trapped and amplified cyclically in the first amplifying part 131, then in the second amplifying part 132 of the regenerative cavity. As long as the voltage of the Pockels cell remains at zero, the polarization of the pulse regeneratively amplified in the first optical amplifier and in the second optical amplifier remains an s-polarization. All the other p-polarized source pulses 100 that pass through the Pockels cell producing a zero phase shift remain p-polarized. The polarizer 61 rejects all the other p-polarized source pulses 100 out of the first amplifying part 131 of the regenerative cavity through the output S2. The regenerative cavity is preferably dimensioned to trap and amplify one pulse at a time.

Two extraction modes are provided. A first extraction mode consists in switching the modulation voltage of the Pockels cell 80 from a zero phase shift to a half-wave phase shift when an s-polarized amplified pulse circulates in the first part 131 of the regenerative cavity. During the passage of an s-polarized amplified pulse through the activated Pockels cell 80 towards the second part 132, the amplified pulse changes of polarization and becomes p-polarized. The polarizer 62 extracts this p-polarized amplified pulse of the regenerative cavity and directs it towards the half-wave plate 54. The half-wave plate 54 change again the polarization of the amplified pulse propagating towards the polarizer 51 into a s-polarization. The polarizer 51 filters the s-polarized amplified pulse coming from the half-wave plate 54 and directs it towards the output S1. An amplified main signal 310 composed of an amplified pulse is hence obtained on the output S1.

A second extraction mode consists in switching the modulation voltage of the Pockels cell 80 from a zero phase shift to a half-wave phase shift when the s-polarized amplified pulse circulates in the second amplifying part 132 of the regenerative cavity. During the passage of an amplified pulse through the activated Pockels cell towards the first part 131, the amplified pulse changes of polarization and becomes p-polarized. The polarizer 62 extracts this p-polarized amplified pulse through the output S2 and forms a p-polarized amplified secondary signal 320.

The advantage of this mode of operation is that the amplification of the pulses occurs while the voltage applied to the Pockels cell is zero.

On the one hand, the Pockels cell is switched a first time in a pulsed manner (by passing from a zero phase shift to a half-wave phase shift for the injection, then, immediately after that, from a half-wave phase shift to a zero phase shift for the trapping) so as to inject and trap a source pulse in the regenerative cavity with a repetition frequency $f_{rep}$ constant over time. Hence, the regenerative cavity amplifies pulses with a constant repetition frequency.

On the other hand, the Pockels cell is switched, also in a pulsed manner (by passing from a zero phase shift to a half-wave phase shift for the extraction of an amplified pulse, then, immediately after the extraction, from a half-wave phase shift to a zero phase shift for placing back the Pockels cell in idle state), but at switching instants selected as a function of the desired output. In a first case, when the Pockels cell is switched at an instant when the amplified pulse circulates in the first amplifying part 131 of the regenerative cavity, the amplified pulse is extracted to the path S1 to form an amplified main signal. In a second case, when the Pockels cell is switched at an instant when the amplified pulse circulates in the second amplifying part 132 of the regenerative cavity, the pulse of the amplified secondary signal is extracted to the path S2 to form an amplified secondary signal. The pulses extracted from the regenerative cavity, spatially distributed on the two outputs S1, S2, while being wholly extracted at the repetition frequency $f_{rep}$ so as to hence ensure the stability of operation of the optical amplifiers 31, 32 of the regenerative cavity.

The operational conditions ensuring a good operation of this fifth embodiment are that the regenerative cavity must be blocked with a voltage producing a half-wave phase shift and that the switching speed of the Pockels cell must be fast enough compared with the duration of circulation in the first amplifying part 131 and, respectively, in the second amplifying part 132 of the regenerative cavity (Tfall<TpartI), Trise<TpartII). The switching time of a Pockels cell is generally comprised between ~1 ns and a few ns.

Preferably, identical first amplifying part 131 and second amplifying part 132 are chosen, so that the duration T1 of a round trip in the first part 131 is equal to the duration T2 of a round trip in the second part 132. The duration of a cycle in the regenerative cavity is approximately equal to the sum of the duration T1 and the duration T2. Herein, the hypothesis is made that the period $1/f_{osc}$ between two source pulses 100 is higher than the duration T1, respectively the duration T2, so that a single pulse circulates in the first amplifying part 131, respectively in the second amplifying part 132 of the regenerative cavity.

In a variant of this fifth embodiment, the regenerating cavity includes a single optical amplifier 31, for example in the first part.

According to an alternative of a fifth embodiment, a half-wave plate is placed between the polarizer 61 and the polarizer 62. The polarization of the output amplified pulses is hence switched by 90 degrees and the amplification of the pulses then occurs when a voltage is applied to the Pockels cell 80.

Moreover, according to an alternative mode of operation, the Pockels cell makes it possible to perform an amplitude modulation of the amplified signal. For example, the slope of the high voltage applied to the Pockels cell during the extraction is determined. Hence, by applying a time shift to this high voltage slope, a phase shift modulated in amplitude is applied between the zero phase shift and half-wave phase shift values, which makes it possible to extract a fraction of a pulse to the output S1 and another fraction of this same pulse to the output S2. The fraction of the pulse extracted to the output S1, respectively S2, may be controlled by adjusting the slope of the phase shift as a function of time. It is hence obtained an amplitude modulation of the amplified pulses on the outputs S1 and S2.

According to another alternative of this fifth embodiment, the first and second amplifying part 131 of the regenerative cavity are replaced by a ring cavity, including one or more optical amplifiers in series.

The invention may be easily implemented in many types of pulse laser systems to offer a great flexibility to the temporal modulation in rate and/or amplitude of the amplified laser pulses, without making compromise on the performances in terms of energy, power, duration, spatial quality of the pulses at the laser output.

The invention applies to any laser system generating laser pulses, whatever the pulse duration, the wavelength, the power, the energy. The invention applies in particular to the fast pulse-to-pulse modulation of a pulse laser having a repetition frequency determined a priori. The invention also applies to the fast modulation of the amplitude of an amplified laser pulse.

The invention especially applies to lasers with high and very high repetition frequencies, for example with a repetition frequency $f_{rep}$ comprised between 10 MHz and 1 GHz, and in particular of several hundreds of MHz or more. The invention applies in particular to the pulse lasers including a master oscillator and at least one amplification stage. The invention applies as well to a laser of high mean power (from 1 watt to a few hundreds of watts, or even a few kilowatts of mean power higher than 50 W) or to a pulse laser of high energy (in the range of hundreds of nanojoules to the millijoule), where the advantages detailed in the description (no loss after the amplifying chain, no active element, critical in high-power transmission) are particularly important.

The switching speed of the pulse selector or modulator arranged upstream of the optical amplifier system, and possibly of the second source 12, makes is possible to obtain a very fast modulation of the amplified main beam, while ensuring the stability of operation of the optical amplifier. In other words, the switching speeds of the pulse selector or modulator and possibly of the second source are compatible with the modulation of ultrashort light pulses in a very high frequency range, of 10 MHz and 1 GHz, and preferably of several hundreds of MHz. The invention hence proposes an ultrashort pulse laser, of high energy and/or high power, modulated in a very wide frequency range, so as to be able to provide as well an ultrashort pulse on demand or ultrashort pulses with a high repetition frequency, up to 1 GHz, without risk of deterioration of the optical amplifier system.

The invention claimed is:

1. A temporally modulated in rate and/or amplitude pulse laser system, comprising:
    a first source comprising a mode-locking laser adapted to generate a source signal composed of source light pulses having a duration comprised between about 1 picosecond and a few hundreds of nanoseconds;
    an optical amplifier system adapted to receive and amplify said source signal,
    wherein the temporally modulated pulse laser system includes:
    a pulse selection or modulation device including a pulse selector or modulator arranged between the first source and the optical amplifier system, the pulse selector or modulator being configured to select or modulate the source signal so as to form a main signal composed of one or more source light pulses, the main signal being temporally modulated in rate and/or amplitude;
    a second source comprising a laser diode emitting a secondary signal comprising secondary light pulses having a duration of at least one nanosecond and
    the laser system being configured to inject simultaneously both the main signal as well as the secondary signal into said optical amplifier system, the optical amplifier system forming both an amplified main signal that is temporally modulated in rate and/or amplitude, as well as an amplified secondary signal,
    the secondary signal being modulated in real time as a function of the temporal modulation in rate and/or amplitude of the main signal, so as to stabilize the energy stored in the optical amplifier system as a function of time, and
    the laser system being configured to spatially separate, to a first output (S1), the temporally modulated in rate and/or amplitude amplified main signal, and, to a second output (S2,) the amplified secondary signal.

2. The temporally modulated pulse laser system according to claim 1, wherein the optical amplifier system has a spectral gain band adapted to amplify the main signal at a first wavelength and the secondary signal at a second wavelength, and wherein the laser system includes a spectral filter configured to spectrally separate the amplified main signal at the first wavelength and the amplified secondary signal at the second wavelength.

3. The temporally modulated pulse laser system according to claim 1, wherein the optical amplifier system is adapted to receive and amplify the main signal polarized in a first polarization state and, respectively, the secondary signal polarized in a second polarization state, said first and second polarization states being orthogonal to each other, and wherein the laser system includes a polarizing separation filter arranged and configured to separate both the amplified main signal polarized in the first polarization state as well as the amplified secondary signal polarized in the second polarization state.

4. The temporally modulated pulse laser system according to claim 2, wherein the optical amplifier system is adapted to receive and amplify the main signal polarized in a first polarization state and, respectively, the secondary signal polarized in a second polarization state, said first and second polarization states being orthogonal to each other, and wherein the laser system includes a polarizing separation filter arranged and configured to separate both the amplified main signal polarized in the first polarization state as well as the amplified secondary signal polarized in the second polarization state.

5. The temporally modulated pulse laser system according to claim 1, wherein the optical amplifier system is adapted to amplify the main signal and the secondary signal propagating along mutually opposed senses between a first input-output and a second input-output of the optical amplifier system and wherein the laser system includes at least one optical filter arranged and configured to separate both the amplified main signal as well as the amplified secondary signal.

6. The temporally modulated pulse laser system according to claim 1, wherein the optical amplifier system presents a spatial and/or angular aperture adapted to amplify the main signal propagating along a first direction and the secondary signal propagating along a second direction, the second direction being spatially and/or angularly separated from the first direction, and wherein the laser system is configured to spatially and/or angularly separate the amplified main signal propagating along the first direction and, respectively, the second amplified signal propagating along the second direction.

7. The temporally modulated pulse laser system according to claim 1, including an optical beam combiner arranged and configured to inject both the main signal as well as the secondary signal into said optical amplifier system.

8. The temporally modulated pulse laser system according to claim 1, wherein the pulse selection or modulation device includes an optical polarization modulator, the optical modulator being configured to receive and modulate the source signal in polarization so as to generate the main signal polarized in the first polarization state, and to generate the secondary signal polarized in the second polarization state.

9. The temporally modulated pulse laser system according to claim 1, wherein the pulse selection or modulation device includes an optical direction modulator configured to receive and modulate the source signal so as to generate the main signal propagating along one direction, and to generate the secondary signal propagating along another direction.

10. The temporally modulated pulse laser system according to claim 1, wherein the pulse selection or modulation device includes an optical modulator configured to receive and modulate the source signal in amplitude so as to generate the amplitude-modulated main signal, and wherein the secondary signal is modulated in amplitude as a function of the temporal amplitude modulation of the main signal.

11. The temporally modulated pulse laser system according to claim 1, wherein the optical amplifier system includes a regenerative cavity including a first part comprising a first optical amplifier and a second part, the pulse selection or modulation device comprising a Pockels cell arranged in the regenerative cavity between the first part and the second part, the Pockels cell being configured to modulate an optical phase shift in the regenerative cavity, an optical filtering device including a first polarizer arranged between the Pockels cell and the first part of the cavity, and a second polarizer arranged between the Pockels cell and the second part of the cavity, the Pockels cell being configured to modulate the optical phase shift a first time, so as to trap a source light pulse into the regenerative cavity, the regenerative cavity amplifying the trapped light pulse to form an amplified light pulse, the Pockels cell being configured to modulate the optical phase shift a second time, either when the amplified light pulse circulates in the first part of the regenerative cavity to form an amplified main signal, the second polarizer being configured so as to direct the amplified main signal towards the first output (S1) of the regenerative cavity, or when the light amplified pulse circulates in the second part of the regenerative cavity to form an amplified secondary signal, the first polarizer being configured so as to direct the amplified secondary signal towards the second output (S2) of the regenerative cavity.

12. The temporally modulated pulse laser system according to claim 1, wherein the pulse selection or modulation device is configured to select or modulate the source signal with a switching time comprised between sub-ns and a few ns.

13. The temporally modulated pulse laser system according to claim 1, wherein the first source is periodic with a repetition period comprised between 10 kHz and 1 GHz.

* * * * *